(12) United States Patent
Goerick et al.

(10) Patent No.: US 9,524,643 B2
(45) Date of Patent: Dec. 20, 2016

(54) ORIENTATION SENSITIVE TRAFFIC COLLISION WARNING SYSTEM

(71) Applicant: HONDA RESEARCH INSTITUTE EUROPE GMBH, Offenbach/Main (DE)

(72) Inventors: Christian Goerick, Offenbach/Main (DE); Bram Bolder, Offenbach/Main (DE); Benjamin Dittes, Zürich (CH)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 13/863,563

(22) Filed: Apr. 16, 2013

(65) Prior Publication Data

US 2013/0282268 A1    Oct. 24, 2013

(30) Foreign Application Priority Data

Apr. 20, 2012    (EP) .................................... 12164976

(51) Int. Cl.
| | |
|---|---|
| *G08G 1/16* | (2006.01) |
| *B60W 30/095* | (2012.01) |
| *G06K 9/00* | (2006.01) |

(52) U.S. Cl.
CPC .............. *G08G 1/16* (2013.01); *B60W 30/095* (2013.01); *G06K 9/00805* (2013.01); *G08G 1/165* (2013.01); *G08G 1/166* (2013.01)

(58) Field of Classification Search
CPC .......... G08G 1/16; G08G 1/165; G08G 1/166; G01S 13/931; G06K 9/00369
USPC .......... 701/300, 301; 348/148, 169; 340/436
See application file for complete search history.

(56) References Cited

U.S. PATENT DOCUMENTS

| | | | |
|---|---|---|---|
| 5,572,428 A | 11/1996 | Ishida et al. | |
| 6,687,577 B2* | 2/2004 | Strumolo | ......................... 701/1 |
| 7,079,924 B2* | 7/2006 | Galbraith | ...................... 700/245 |
| 8,031,906 B2* | 10/2011 | Fujimura et al. | ............. 382/103 |
| 8,633,832 B2* | 1/2014 | Koike | ........................... 340/903 |

(Continued)

FOREIGN PATENT DOCUMENTS

| | | |
|---|---|---|
| EP | 2172919 A1 | 4/2010 |
| EP | 2574958 A1 | 4/2013 |
| WO | WO 2010/089661 A2 | 8/2010 |

OTHER PUBLICATIONS

T. Gandhi, M. Trivedi, "Image Based Estimation of Pedestrian Orientation for Improving Path Prediction," In Proc. 2008 IEEE Intelligent Vehicles Symposium, pp. 506-511, 2008.*

(Continued)

*Primary Examiner* — Thomas G Black
*Assistant Examiner* — Peter D Nolan
(74) *Attorney, Agent, or Firm* — Squire Patton Boggs (US) LLP

(57) ABSTRACT

The present invention provides an Advanced Driver Assistant System (ADAS) 10 and an operating method thereof, which work on long time scales, and guide an ego vehicle 20 away from upcoming risks, rather than only reacting to risks to mitigate the consequences of a crash. To this end, information comprising the orientation of other traffic participants 30, 40, 50, 60, a free driving area of the ego vehicle 20, and/or a driving trajectory of the vehicle 20 as intended by the driver is taken into account, in order to determine potential risks.

11 Claims, 2 Drawing Sheets

(56) References Cited

U.S. PATENT DOCUMENTS

| | | |
|---|---|---|
| 8,660,734 B2* | 2/2014 | Zhu et al. ............... 701/23 |
| 2008/0065328 A1 | 3/2008 | Eidehall et al. |
| 2009/0132165 A1* | 5/2009 | Gabrielsson et al. ........ 701/300 |
| 2010/0030474 A1* | 2/2010 | Sawada ................... 701/301 |
| 2011/0210866 A1* | 9/2011 | David et al. ............. 340/903 |
| 2011/0246156 A1* | 10/2011 | Zecha et al. ............... 703/6 |
| 2012/0026332 A1* | 2/2012 | Hammarstrom et al. .... 348/148 |
| 2012/0116662 A1* | 5/2012 | Zeng et al. ............... 701/300 |
| 2013/0238181 A1* | 9/2013 | James ....................... 701/23 |
| 2013/0268185 A1* | 10/2013 | Rabbath et al. ........... 701/300 |

OTHER PUBLICATIONS

P. Rybski, D. Huber, D. Morris and R. Hoffman, "Visual Classification of Coarse Vehicle Orientation using Histogram of Oriented Gradients Features," In Proc. 2010 IEEE Intelligent Vehicles Symposium, pp. 921-928, 2010.*

European Search Report dated Aug. 28, 2012 corresponding to European patent application No. 12164976.8.

Kaempchen et al., "Situation Assessment of an Autonomous Emergency Brake for Arbitrary Vehicle-to-Vehicle Collision Scenarios," IEEE Transactions of Intelligent Transportation Systems, vol. 10, No. 4, Dec. 1, 2009, pp. 678-687, XP011347200.

Radu Danescu et al., "New Results in Stereovision Based Lane Tracking," 2011 IEEE Intelligent Vehicles Symposium (IV), Jun. 5-9, 2011, pp. 230-235.

Michael Gabb et al., "Efficient Monocular Vehicle Orientation Estimation Using a Tree-Based Classifier," 2011 IEEE Intelligent Vehicles Symposium (IV), Jun. 5-9, 2011, pp. 308-313.

Thomas Gumpp et al., "Lane Confidence Fusion for Visual Occupancy Estimation," 2011 IEEE Intelligent Vehicles Symposium (IV), Jun. 5-9, 2011, pp. 1041-1046.

Chunzhao Guo et al., "Drivable Road Region Detection Using Homography Estimation and Efficient Belief Propagation with Coordinate Descent Optimization," Proc. IEEE Intelligent Vehicles Symposium, 2009, pp. 317-323.

Bastian Leibe et al., "Dynamic 3D Scene Analysis from a Moving Vehicle," CVPR 2007, 8 pages.

Thomas Michalke et al., "Adaptive Multi-Cue Fusion for Robust Detection of Unmarked Inner-City Streets," Proc. IEEE Intelligent Vehicles Symposium, 2009, pp. 1-8.

Jan Siegemund et al., "A Temporal Filter Approach for Detection and Reconstruction of Curbs and Road Surfaces Based on Conditional Random Fields," 2011 IEEE Intelligent Vehicles Symposiums (IV), Jun. 5-9, 2011, pp. 637-642.

* cited by examiner

ORIENTATION SENSITIVE TRAFFIC COLLISION WARNING SYSTEM

The present invention relates to an orientation sensitive traffic collision warning system. In particular, the present invention relates to an Advanced Driver Assistant System (ADAS) for a vehicle and a method for operating such an ADAS.

ADAS for vehicles may be used to warn the driver of the vehicle (i.e. the driver of the ego vehicle, in which the ADAS is installed) about dangerous situations involving other traffic participants. ADAS may also be used to trigger actions of the ego vehicle for avoiding said dangerous situations, or for mitigating the impact of an inevitable collision. ADAS usually contain an environment perception subsystem that delivers positions and speed of other traffic participants in the closer environment of the ego vehicle. Further, ADAS usually contain a subsystem for warning and/or generating action, which includes some kind of inference and decision making process.

State of the art ADAS have as main disadvantage that they do not infer any information about the possible risks for the ego vehicle from the orientation of static objects that are close to the driving space or trajectory of the ego vehicle.

'Efficient Monocular Vehicle Orientation Estimation using a Tree-Based Classifier", Gabb et al., Intelligent Vehicles V201' deals only with orientation estimation of vehicles.

'Dynamics 3D Scene Analysis from a moving vehicle, Leibe et al., CVPR 2007' deals with estimating a 3D scene including the recognition of four canonical orientations of vehicles.

Both publications, however, do not suggest any risk inference and/or warning strategies, and use orientation recognition only for the improvement of visual tracking.

Other publications require a moving vehicle for estimating the orientation, but fail to estimate the orientation of static objects.

'New Results in Stereovision-Based Lane Tracking, R. Danescu, S. Nedevschi, IEEE Intelligent Vehicles Symposium, 2011, pp. 230-235' and 'Lane confidence fusion for visual occupancy estimation, Gump, T et al., IEEE Intelligent Vehicles Symposium, 2011, pp. 1043-1048' describes approaches based on lane marking, which will not scale to inner city settings.

'A Temporal Filter Approach for Detection and Reconstruction of Curbs and Road Surfaces based on Conditional Random Fields, Siegemund, Franke and Förstner, IEEE Intelligent Vehicles Symposium, 2011, pp. 637-642' discloses 3D based approaches that require a digital elevation map.

'Drivable road region detection using homography estimation and efficient belief propagation with coordinate descent optimization, C. Guo, S. Mita, and D. McAllester, Proc. IEEE Intelligent Vehicles Symp., 2009, pp. 317-323' presents a stereo and nomography based approach.

'Adaptive multi-cue fusion for robust detection of unmarked inner-city street, Michalke, T. Kastner, R. Herbert, M. Fritsch, J. Goerick, C., Proc. IEEE Intelligent Vehicles Symp., 2009, pp. 1-8.' proposes an adaptive but non-prelearned approach.

In consequence the known state of art ADAS have several limitations. As mentioned above, the orientation (which can also be referred to as the pose) of other traffic participants is not detected or used in a risk inference process. However, considering such information would allow determining how traffic participants will most likely move in the future, even if they are currently not moving. Such a determination can be considered as nonlinear probabilistic trajectory estimation. Employing such estimation would allow for creating a foresighted ADAS that keeps the ego vehicle away from likely, but not yet directly observable, dangers.

Moreover, mitigation systems known from the state of the art are based on the assumption that a crash with another traffic participant is inevitable, and that actions need to be taken, in order to mitigate the consequences of this crash. However, such a determination that the crash is inevitable is only possible very shortly before the actual crash. Driver actions do not have any influence on this time scale anymore. The decisions of those mitigation systems are usually laid out to be very safe, i.e. they do not have relevant false alarm rates, because there are only a small number of highly relevant indicators. However, such state of the art systems work only for very low time spans before a crash.

The present invention aims to improve the state of the art by overcoming the above-mentioned disadvantages. In particular, the aim of the present invention is to provide an ADAS that works on longer time scales, and guides the driver and the ego vehicle away from upcoming risks, rather than only reacting to risks, in order to mitigate the consequences of a crash.

When the systems move away from the short time scales of mitigation, the false alarm rate may increase, because predictions of a potential crash will have a larger variance. Hence, the predictions may even fail.

Therefore, the ADAS of the present invention also aims to consider more information for narrowing down the variance of its predictions. Such further information comprises the orientation or pose of other traffic participants, a driving area and/or driving corridor of the ego vehicle, and the driving trajectory of the vehicle as intended by the driver.

The following solutions of the present invention are monocular and without the necessity of additional infrastructure. Therefore, the present invention is very competitive.

In particular, the present invention achieves the above-mentioned aims according to the attached independent claims. Moreover, the dependent claims develop the advantages of the present invention.

The present invention is specifically directed to an ADAS for a vehicle comprising at least one sensor for detecting one or more traffic participants, a computing unit for receiving a sensor signal from the at least one sensor, determining from the sensor signal an orientation of each of the traffic participants in respect to the vehicle, and predicting from the determined orientations one or more potential risks for the vehicle.

The orientation allows the ADAS to estimate a possible moving direction of the traffic participants, which could pose a potential risk. Potential risks can be expressed by the ADAS as risk values, which are for example set to a larger value the higher a risk is considered to be for the vehicle.

As visual sensors one or more cameras are preferred. However, other visual sensors, like laser sensors or light sensors, can be employed to detect the visual features of the traffic participants. The detected visual features can be analyzed (e.g. parameterized) and/or compared by the ADAS (i.e. a computing unit of the ADAS) with pre-stored visual features, which are e.g. stored in a memory or a database of the ADAS. In this way, e.g. the size, color, shape and thus the orientation of the traffic participant can be determined.

Preferably, the computing unit is adapted to extract from the sensor signal visual features of a traffic participant, and to determine the orientation of the traffic participant based on an analysis of the extracted visual features.

Preferably, the computing unit is adapted to analyze the extracted visual features by comparing them to visual features stored in a memory of the ADAS.

The orientation of a traffic participant can be, for example, its forward facing or heading direction as determined by the ADAS based on the extracted visual features. The visual features can be features like shape or size of the traffic participant. In particular, static objects, i.e. objects like non-moving vehicles and pedestrians, will most likely not start moving in an arbitrary direction, but rather in the one direction they are currently facing. Therefore, the facing direction is an indicator for future movement of a traffic participant. The facing direction can be determined from the appearance of the traffic participant, e.g. the visual features, shape, color etc. Traffic participants need not move for the determination of this information, however, determination is also possible for currently moving traffic participants. Taking into account non-moving traffic participants increases the security of the ADAS.

Preferably, the computing unit is adapted to continuously determine an angle between the orientation of a traffic participant and the current driving direction of the vehicle.

This applies to all motion states of all traffic participants, i.e. all static and moving traffic participants. By continuously performing the determination, the risk detection and aversion of the ADAS can be improved. If a non-moving (in terms of driving or walking direction) traffic participant changes its orientation, the change is detected by the ADAS and new risks potentially arising from this change can be estimated. For example, if the angle of orientation, i.e. the facing direction of the traffic participant, suddenly intersects with the driving direction of the vehicle, a new danger of a collision exists.

Preferably, the computing unit is adapted to determine the type of a traffic participant, in particular, whether the traffic participant is a vehicle or a pedestrian, based on the extracted visual features.

The ADAS can e.g. determine whether the traffic participant is a car, a truck, a bicycle, a motor-bicycle, a pedestrian or a train. Again the extracted visual features from the signal detected by the one or more visual sensors can be compared with pre-stored visual features. To this end e.g. a camera image is analyzed by the processing means of the ADAS.

The determination of the type of the traffic participant allows the ADAS to improve the determination of the orientation. The determination of the type further allows the ADAS to attribute the traffic participant with pre-stored characteristics, which it can take into account for valuing potential risks. For example, the ADAS can take into account the expected speed of the traffic participant (pedestrians move e.g. slower than cars), the weight of the traffic participants (an impact with a truck might be even more dangerous than an impact with a car) or the probable moving path (a pedestrian will most likely use a different lane than a car or bicycle). The type of the traffic participant can be taken into account when calculating the risk values of potential risks.

Preferably, the computing unit, if it determines that a traffic participant is a vehicle, is adapted to distinguish between front side and back side of the vehicle, and to determine as the orientation a direction pointing from said back side to said front side.

The front and back side of a vehicle are derived from the extracted visual features. The determination of front and back side can increase the accuracy of prediction of the orientation of the traffic participant, and thus its possible future movement.

Preferably, the computing unit is adapted to determine information concerning a driving area of the vehicle, and to predict potential risks for the vehicle by taking only into account the orientation of traffic participants being relevant to the driving area.

The driving area (also referred to as free driving area) or driving corridor is the area, in which the ego vehicle is expected to drive. Therefore, monitoring parameters of the ego vehicle, like current speed, settings in a navigation system or activated turn signals can be taken into account. Also the allowed driving area can be taken into account by detecting lanes, markings and the like. Only the relevant traffic participants are dealt with, and consequently processing resources of the ADAS can be saved.

Preferably, the ADAS further comprises means for measuring a distance between a traffic participant and the driving area of the vehicle, and to consider the traffic participant as relevant, if the determined distance is below a predetermined threshold.

Thus, only traffic participants being close to the free driving area of the vehicle are considered. Those traffic participants are the most relevant for the safety of the ego vehicle. The probability of close traffic participants to interfere with the driving area or corridor of the vehicle is higher than for remote traffic participants. The distance can be derived from the one or more camera sensors or can be measured e.g. by a light or laser sensor. Other known distance measurement techniques can also be applied.

Preferably, the computing unit is further adapted to determine an intended driving trajectory of the vehicle.

Preferably, the computing unit is adapted to monitor vehicle parameters concerning the actions and intentions of a driver of the vehicle, and to determine the driving trajectory based on a past trajectory of the vehicle and/or the monitored vehicle parameters.

The ADAS can for example access a log, e.g. of a navigation system or GPS of the vehicle, in order to determine current and/or past driving trajectories or habits of the vehicle or driver, respectively. The intentions of the driver can also be derived e.g. from the current speed of the vehicle, acceleration, deceleration, set turn signals, settings of a navigation system or the like.

Preferably, the computing unit is adapted to compute, whether the driving trajectory of the vehicle is sufficient to avoid the predicted potential risks.

The ADAS takes into account the estimated future driving trajectory of the vehicle, and/or the above-mentioned parameters like speed, acceleration etc. The ADAS can calculate a probability value for avoiding the dangerous situation, and can determine the sufficiency of the trajectory based on a threshold value.

Preferably, the computing unit is adapted to output a warning signal, if it determines that the determined driving trajectory of the vehicle is not sufficient to avoid the predicted potential risk.

A warning can be issued by sound or by visual indication, e.g. in a Human Machine Interface (HMI) of the vehicle. Otherwise, i.e. if the intended driving trajectory is found to be sufficient, no warning is issued. This will reduce annoying false alarms in situations where the driver has already started to react to an upcoming risk.

Preferably, the computing unit is adapted to extract from the sensor signal a moving direction of a traffic participant, and to determine the orientation of the traffic participant based on the moving direction.

Preferably, the computing unit is adapted to rank all determined potential risks, and to issue a warning signal only for a potential risk that is ranked above a predetermined threshold rank.

The predicted risk values and the trajectory information can be considered, and it can be inferred, whether the driver seems to be aware of the highest ranked potential risks or not (i.e. the risks considered to have the highest value). Only if the driver does not seem to be aware of the risks, a highlighting of a corresponding risk inducing entity (warning) in some HMI of the vehicle will be triggered, in order to inform the driver, and to guide his attention to the upcoming risk.

The present invention is also directed to a method for operating an ADAS for a vehicle, wherein the method comprises the steps of detecting one or more traffic participants, determining from the sensor signal an orientation of each of the traffic participants in respect to the vehicle, and predicting from the determined orientations one or more potential risks for the vehicle.

The method can also include further steps so that the advantageous features described for the ADAS are achieved.

The present invention will be explained in the following in reference to the attached figures.

Figure 1:
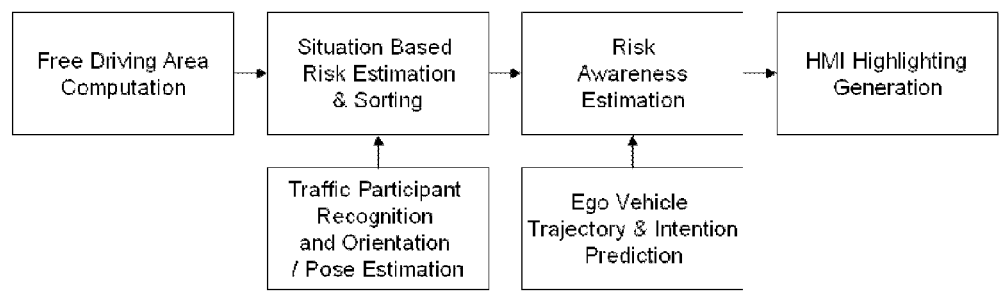
FIG. 1 shows a block diagram of actions performed in the ADAS of the present invention.

In general the present invention infers from the orientation of each of one or more traffic participants 30, 40, 50, 60 close to a free driving area of the ego vehicle 20 one or more potential risks for the ego vehicle 20, and can warn the driver of the ego vehicle 20, if the monitored driving action of the driver suggest that the driver is not aware of the upcoming risks. As a running process the ADAS 10 performs continuously the following processing steps.

One or more visual sensors 11a, 11b, e.g. cameras or other suitable light or laser sensors, monitor at least the area in front of the vehicle 20, and continuously deliver sensor data S11a, S11b, e.g. image data, for subsequent processing in processing means (the computing unit 12) included in the ADAS 10. The cameras 11a, 11b can also monitor the lateral sides or the rear side of the vehicle 20. Based on said sensor data S11a, S11b, e.g. the images obtained from the one or more camera 11a, 11b, the free driving area for the vehicle 20 can be determined. The free driving area describes an area, which the ego vehicle 20 can safely drive to or through without colliding with an object (e.g. traffic participant or obstacle) that already resides on this area.

The free driving area may be further enhanced with information about the legally drivable area as indicated by markings, signs or general driving rules. The information can be obtained from a navigation system (e.g. GPS) or the Internet. The free driving area can e.g. be analyzed and determined according to the road-terrain detection method described in EP 11 183 057.

Such a road-terrain detection method comprises sensing the environment of the vehicle with the at least one sensor 11a, 11b, transforming the sensor signal S11a, S11b into at least one confidence map of local properties of the environment by using at least one base classifier, generating spatial features for the local properties based on the at least one confidence map, and classifying locations in the environment of the vehicle 20 to a certain category of road terrain based on the generated spatial features. An entry of the confidence map contains confidence information about whether a corresponding location (e.g. a pixel position or a cell in a metric space) has a certain property. A confidence map thus represents for each location e.g. in a space representations the confidence about the property of each location. A base classifier is for visual boundary classification, in order to find visual features that discriminate a road boundary, such as curbstones, from a road-like area. Risk of collisions between the ego vehicle and other traffic participants is estimated by the processing means.

In parallel to the determination of the free driving area, all traffic participants 30, 40, 50, 60 that are seen in the field of view of at least one of the cameras 11a, 11b are detected. In particular, their position and velocity is determined by the computing unit 12 based on the camera images, and their orientation is estimated and tracked by comparison of extracted visual features from the camera image with visual features that are e.g. stored in a memory 15 of the ADAS 10. Optionally, also the type of the traffic participants 30, 40, 50, 60 can be derived from extracted visual attributes (e.g. size, shape color etc.)

The free driving area and the traffic participant information are analyzed in a situation based risk estimation processing step.

Established deterministic trajectory based methods can be employed for estimating the risk of the ego vehicle 20 colliding with moving traffic participants. For static objects is proposed to estimate the risk of collision based on their orientation, i.e. the direction in which the object would most likely start moving. The information is compared with the free driving area, and the ADAS 10 determines, whether a collision with the ego vehicle 20 can occur, and how likely a collision is. The probability of such a collision can be expressed by a risk value, and relevant potential risks can be determined based on an evaluation of the risk value.

Objects closer to the drivable area of the vehicle 20, and objects facing towards the drivable area have a higher risk of collision with the ego vehicle 20 than objects further away from said drivable area, or objects pointing (facing) away from said area. This is explained below in relation to the example in FIG. 3. The resulting risks for each object, i.e. each traffic participant, can be expressed in values and can be sorted (ranked).

Issuing a warning based on the above-described information might lead to many unnecessary warnings, because the driver might already be aware of the risks. A clear sign of the awareness of the driver is for example a reaction of slightly adapting the trajectory of the vehicle or slightly slowing down the moving speed of the vehicle 20.

It is therefore the task of the ego vehicle trajectory and intention prediction module to deliver such kind of information. Therefore, the ADAS 10 can continuously or at intervals monitor parameters of the vehicle 20, like current speed, acceleration, orientation of the steering wheel, set turn signals and the like. The prediction is combined with the risk value in the risk awareness estimation module. Only if there is a clear risk that the driver is not reacting to the potential risk, a HMI 22 of the vehicle 20 is used for highlighting the source of the risk, e.g. visually in the field of view of the driver. Also acoustic warnings can be issued.

Figure 2:
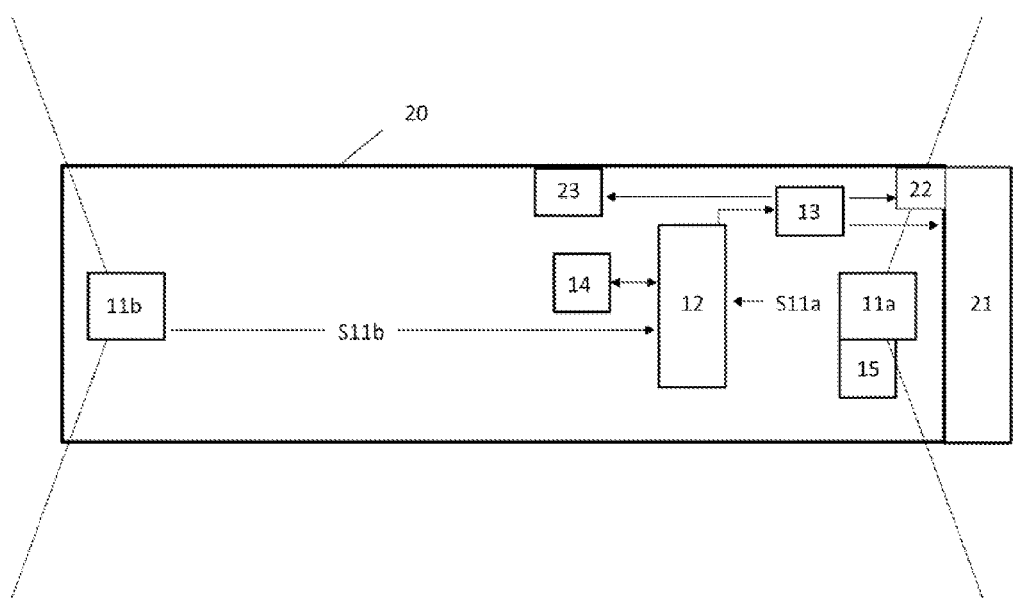
FIG. 2 shows a block diagram of the ADAS of the present invention as installed in the ego vehicle.

FIG. 2 shows a schematic diagram of the ADAS 10 as it can be installed in the ego vehicle 20. The ADAS 10 includes the at least one sensor 11a, 11b, which is preferably a camera. Each sensor 11a, 11b is able to detect traffic participants in its field of view (indicated by the dashed lines).

Each sensor 11a, 11b outputs a sensor signal S11a, S11b to the computing unit 12. The computing unit 12 can extract visual features from the sensor signals S11a, S11b. Known image processing algorithms like e.g. edge detection of objects can be used to this end. The computing unit 12 further communicates (read/with) a memory 14 of the ADAS 10, in which e.g. the visual features can be stored. The computing unit 12 can then also compare extracted visual features with stored visual features, in order to determine an orientation, shape, size or type of a traffic participant.

Each sensor 11a, 11b can be provided or can include distance measurement means 15, e.g. light or laser means or other means for continuously measuring distances of traffic participants. The computing unit 12 can calculate distances to positions on the free driving area of the vehicle 20, i.e. distances to certain points on the intended driving trajectory, which the vehicle 20 will reach in the future.

The computing unit 12 is also able to extract from the sensor data S11a, S11b moving directions of traffic participants. Known image analysis techniques can be applied to this end.

The computing unit 12 generates an output signal, if it determines that a potential risks arises from one or more of detected other traffic participants. The output signal can be received by a warning unit 13, which can then determine what kind of action is to be executed. The warning unit 13 can instruct a HMI 22 of the vehicle to indicate a warning signal to the driver of the vehicle 20. The warning unit 13 can also act as an actuator for the driving system 21 (motor control) of the vehicle 20. For example, the warning unit 13 can automatically induce braking, deceleration, acceleration, steering or other actions of the vehicle 20. The warning unit 13 can also communicate with a board computer 23 of the vehicle 20, in order to indicate to the driver the potential risk or to take immediate necessary actions to avoid potential collisions.

Figure 3:
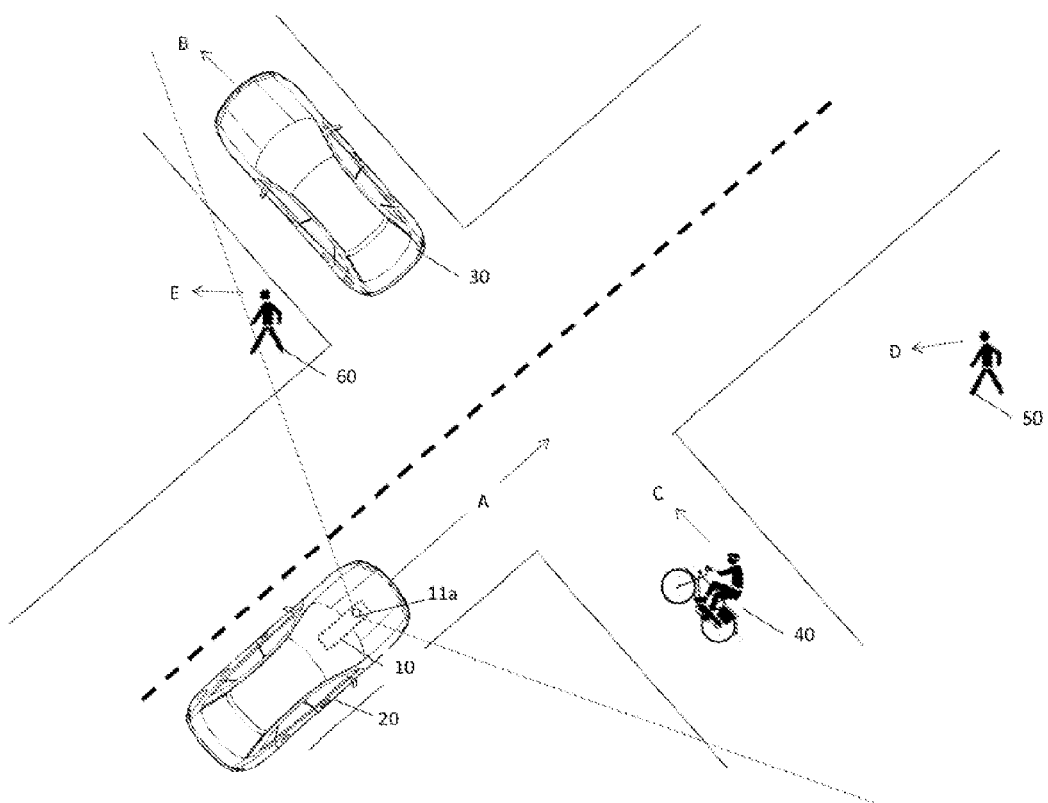
FIG. 3 shows a traffic situation for the ego vehicle with the ADAS of the present invention.

FIG. 3 shows an exemplary traffic situation for the ego vehicle 20, which is equipped with the ADAS 10 of the present invention. The ADAS 10 includes at least one front camera 11a, which detects traffic participants 30, 40, 50, 60 that are in its field of view (indicated by the dotted lines extending from the camera 11a). The computing unit 12 of the ADAS 10 is able to extract visual features concerning the other traffic participants 30, 40, 50, 60 from the sensor (camera) signal S11a. The visual features allow the computing unit 12 to determine an orientation of each of the traffic participants in respect to the vehicle 20, in particular in respect to the driving direction (trajectory) of the vehicle 20. Said driving trajectory is determined by the computing unit 12 and is indicated in FIG. 3 by the dotted arrow A.

The computing unit 12 is able to analyze the visual features for an orientation, e.g. by comparing them to known (stored) visual features. The computing unit 12 for examples determines orientations B, C, D, and E for the traffic participants 30, 40, 50, and 60, respectively. For vehicles like the car 30 or the bicycle 40 the orientation can be determined by distinguishing a back side and a front side of the vehicle. The orientation can then be the direction from the back side to the front side. For pedestrians the orientation can be determined by face recognition or by other prominent visual features that determine the appearance of the pedestrian.

It can be seen from FIG. 3 that the orientation of a traffic participant is, particularly for non-moving participants, a good indication for an estimation of a future movement. Based on the determined orientation the computing unit 12 is thus adapted to infer potential risks.

In FIG. 3 a low potential risk will be seen for traffic participant 60. The orientation faces away from the estimated driving trajectory of the vehicle 20. The pedestrian 60 will most likely move away from the trajectory of the vehicle 20. Therefore, the risk for a collision is low.

The traffic participant 40, however, has an orientation that is relevant to the driving trajectory of the vehicle 20. Danger of collision is high.

The same is true for traffic participant 50. However, since the pedestrian 50 is still at a considerable distance from the free driving area of the vehicle 20, the potential risk might not yet be high enough to be considered as relevant. This could obviously change, if the pedestrian 50 starts moving in the direction of the free driving area of the vehicle 20. For the determination of the potential risk the computing unit 12 is able to determine the type of traffic participants. Then it can take into account known (stored) characteristics of the recognized traffic participant, e.g. speed. Pedestrians will move slower than vehicles.

In summary, the present invention provides an ADAS 10 that works on longer time scales, and guides the driver and the ego vehicle away from upcoming risks, rather than only reacting to risks to mitigate the consequences of a crash. To this end, information comprising the orientation or pose of other traffic participants 30, 40, 50, 60, a possible driving area of the ego vehicle 20, and/or the driving trajectory of the vehicle 20 as intended by the driver are taken into account to determine potential risks.

The invention claimed is:

1. An advanced driver assistant system for an ego vehicle, the system comprising:
   at least one sensor configured to detect one or more traffic participants;
   a computing unit configured to receive a sensor signal from the at least one sensor, to determine from the sensor signal an orientation of each of the detected traffic participants in respect to the ego vehicle,
   wherein the computing unit is configured to determine whether the traffic participant is a vehicle or pedestrian, based on extracted visual features of the traffic participant, and if it determines that the traffic participant is a vehicle, to distinguish between front side and back side of the vehicle and to determine as the orientation a direction pointing from said back side to said front side;
   the computing unit is configured to calculate a distance between the traffic participant and a driving area, in which the ego vehicle is expected to drive and which the ego vehicle will reach in the future, and to consider the traffic participant as relevant, if the determined distance is below a predetermined threshold and the determined orientation of the traffic participant is relevant to the driving area; and
   the computing unit is configured to determine information concerning the driving area, and to predict the potential risks for the ego vehicle by taking only said relevant traffic participants into account.

2. The advanced driver assistant system according to claim 1, wherein the computing unit is configured to extract from the sensor signal visual features of a traffic participant, and to determine the orientation of the traffic participant based on an analysis of the extracted visual features.

3. The advanced driver assistant system according to claim 2, wherein the computing unit is configured to analyze the extracted visual features by comparing them to visual features stored in a memory of the advanced driver assistant system.

4. The advanced driver assistant system according to claim 2, wherein the computing unit is configured to continuously determine an angle between the orientation of the traffic participant and the current driving direction of the ego vehicle.

5. The advanced driver assistant system according to claim 1, wherein the computing unit is further configured to determine an intended driving trajectory of the ego vehicle.

6. The advanced driver assistant system according to claim 5, wherein the computing unit is configured to monitor vehicle parameters concerning the actions and intentions of a driver of the ego vehicle, and to determine the driving trajectory based on a past trajectory of the ego vehicle and/or the monitored vehicle parameters.

7. The advanced driver assistant system according to claim 6, wherein the computing unit is configured to output a warning signal if it determines that the determined driving trajectory of the ego vehicle is not sufficient to avoid the predicted potential risk.

8. The advanced driver assistant system according to claim 5, wherein the computing unit is configured to compute whether the driving trajectory of the ego vehicle is sufficient to avoid the predicted potential risks.

9. The advanced driver assistant system according to claim 1, wherein the computing unit is configured to extract from the sensor signal a moving direction of a traffic participant, and to determine the orientation of the traffic participant based on the moving direction.

10. The advanced driver assistant system according to claim 1, wherein the computing unit is configured to rank all determined potential risks, and to issue a warning signal only for a potential risk that is ranked above a predetermined threshold rank.

11. A method for operating an advanced driver assistant system for an ego vehicle, the method comprising:
 detecting one or more traffic participants with at least one sensor;
 determining, from a sensor signal of the at least one sensor, an orientation of each of the traffic participants in respect to the ego vehicle;
 determining whether the traffic participant is a vehicle or pedestrian, based on extracted visual features of a traffic participant; and
 if it is determined that a traffic participant is a vehicle, distinguishing between front side and back side of the vehicle and determining as the orientation a direction pointing from said back side to said front side,
 wherein the detecting further comprises calculating a distance between the traffic participant and a driving area, in which the ego vehicle is expected to drive and which the ego vehicle will reach in the future, and to consider the traffic participant as relevant, if the determined distance is below a predetermined threshold and the determined orientation of the traffic participant is relevant to the driving area; and
 determining information concerning the driving area, and to predict the potential risks for the ego vehicle by taking only said relevant traffic participants into account.

* * * * *